United States Patent
Liu et al.

(10) Patent No.: US 12,117,856 B2
(45) Date of Patent: Oct. 15, 2024

(54) GIMBAL DEVICE AND GIMBAL DEVICE CONTROL METHOD

(71) Applicant: SZ DJI TECHNOLOGY CO., LTD., Shenzhen (CN)

(72) Inventors: Shuai Liu, Shenzhen (CN); Yingzhi Wang, Shenzhen (CN); Wenjun Wang, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 559 days.

(21) Appl. No.: 17/366,475

(22) Filed: Jul. 2, 2021

(65) Prior Publication Data
US 2022/0011787 A1   Jan. 13, 2022

Related U.S. Application Data

(63) Continuation of application No. PCT/CN2019/070502, filed on Jan. 4, 2019.

(51) Int. Cl.
| | |
|---|---|
| *F16M 11/18* | (2006.01) |
| *F16M 11/12* | (2006.01) |
| *F16M 13/04* | (2006.01) |
| *G03B 17/56* | (2021.01) |
| *G05D 3/12* | (2006.01) |

(52) U.S. Cl.
CPC ............ *G05D 3/12* (2013.01); *F16M 11/121* (2013.01); *F16M 11/18* (2013.01); *F16M 13/04* (2013.01); *G03B 17/561* (2013.01)

(58) Field of Classification Search
CPC ...... G03B 17/561; F16M 13/04; F16M 11/18; F16M 11/121; G05D 3/12
See application file for complete search history.

(56) References Cited

U.S. PATENT DOCUMENTS

| | | |
|---|---|---|
| 2016/0381271 A1 | 12/2016 | Cheng et al. |
| 2017/0118415 A1 | 4/2017 | Gao et al. |
| (Continued) | | |

FOREIGN PATENT DOCUMENTS

| | | |
|---|---|---|
| CN | 204083738 U | 1/2015 |
| CN | 104360690 A | 2/2015 |
| CN | 105090695 A | 11/2015 |
| (Continued) | | |

OTHER PUBLICATIONS

The World Intellectual Property Organization (WIPO) International Search Report for PCT/CN2019/070502 Sep. 27, 2019 5 Pages (including translation).

*Primary Examiner* — Christopher E Mahoney
(74) *Attorney, Agent, or Firm* — ANOVA LAW GROUP, PLLC

(57) ABSTRACT

A control method of a handheld gimbal includes, in response to a gimbal of the handheld gimbal entering a movement status, obtaining an attitude of a handle of the handheld gimbal that carries the gimbal, determining an expected photograph mode from a plurality of photograph modes according to the attitude of the handle, and controlling the gimbal to enter the expected photograph mode. The plurality of photograph modes comprise an up flashlight mode, a vertical photograph mode, a forward photograph mode, a reverse photograph mode, and a down flashlight mode.

20 Claims, 7 Drawing Sheets

(56) References Cited

U.S. PATENT DOCUMENTS

2018/0031951 A1    2/2018  Wang et al.
2020/0041878 A1*  2/2020  Lan ........................ G10L 15/22

FOREIGN PATENT DOCUMENTS

| CN | 105468028 | A |   | 4/2016  |          |
|----|-----------|---|---|---------|----------|
| CN | 205176664 | U |   | 4/2016  |          |
| CN | 205859553 | U |   | 1/2017  |          |
| CN | 107370879 | A |   | 11/2017 |          |
| CN | 107430407 | A |   | 12/2017 |          |
| CN | 108061218 | A |   | 5/2018  |          |
| CN | 108184061 | A |   | 6/2018  |          |
| CN | 108259703 | A |   | 7/2018  |          |
| CN | 108521814 | A |   | 9/2018  |          |
| CN | 109071034 | A |   | 12/2018 |          |
| CN | 209604859 | U | * | 11/2019 | F16M 11/10 |
| CN | 113195958 | A | * | 7/2021  | F16M 11/04 |
| EP | 3284997   | A1 |  | 2/2018  |          |
| WO | 2013169131 | A1 |  | 11/2013 |          |
| WO | 2014203593 | A1 |  | 12/2014 |          |

* cited by examiner ical Field

The present disclosure generally relates to the gimbal field and, more particularly, to a handheld gimbal and a handheld gimbal control method.

BACKGROUND

When a handheld gimbal is used to photograph, some pictures need to be photographed by the handheld gimbal in a down flashlight mode and a vertical photograph mode. The existing handheld gimbal cannot directly enter the down flashlight mode and the vertical photograph mode. The handheld gimbal can only be controlled manually to enter the down flashlight mode or the vertical photograph mode. Manual adjustment is complex and has low efficiency. Thus, wonderful photographing moments are easy to be missed.

SUMMARY

Embodiments of the present disclosure provide a control method of a handheld gimbal including a handle and a gimbal arranged at the handle. The method includes, in response to the gimbal entering a movement status, obtaining an attitude of the handle, determining an expected photograph mode from a plurality of photograph modes according to the attitude of the handle, and controlling the gimbal to enter the expected photograph mode. The plurality of photograph modes comprise an up flashlight mode, a vertical photograph mode, a forward photograph mode, a reverse photograph mode, and a down flashlight mode Embodiments of the present disclosure provide a handheld gimbal including a handle, a gimbal, and a controller. The gimbal is arranged at the handle and configured to carry an imaging device. The controller is arranged at the handle and configured to, in response to the gimbal entering a movement status, obtain an attitude of the handle; determine an expected photograph mode from a plurality of photograph modes according to the attitude of the handle, and control the gimbal to enter the expected photograph mode. The plurality of photograph modes comprise an up flashlight mode, a vertical photograph mode, a forward photograph mode, a reverse photograph mode, and a down flashlight mode.

REFERENCE NUMERALS

1 handle, 2 gimbal, 21 outer frame, 22 middle frame, 3 imaging device, 4 display, 5 controller

DETAILED DESCRIPTION OF THE EMBODIMENTS

The technical solution of embodiments of the present disclosure is described in detail in connection with the accompanying drawings of embodiments of the present disclosure. Described embodiments are merely some embodiments of the present disclosure not all embodiments. Based on embodiments of the present disclosure, all other embodiments obtained by those of ordinary skill in the art without creative efforts are within the scope of the present disclosure.

In the related technology, an existing handheld gimbal cannot directly enter a down flashlight mode and a vertical photograph mode when the handheld gimbal is on. The handheld gimbal can only be controlled manually to enter the down flashlight mode or the vertical photograph mode. Manually controlling the handheld gimbal to change the mode is of complexity and low efficiency. For example, a user needs to turn on the handheld gimbal to enter into an operation interface to select a photograph mode, adjust a handle status, thus, wonderful photograph moments may be missed. To solve the problem, the handheld gimbal of embodiments of the present disclosure may determine an expected photograph mode of the handheld gimbal based on included angles between different directions and a vertical direction in a coordinate system of the handle when the handheld enters a movement status. That is, the handheld gimbal may be controlled to directly enter the up flashlight mode or the vertical photograph mode when the handheld gimbal enters the movement status. The user does not need to perform an additional operation. Gimbal automatic control has high accuracy and efficiency, which may satisfy user application needs better.

In connection with the accompanying drawings, the handheld gimbal control method and the handheld gimbal of the present disclosure are described in detail. When there is no conflict, embodiments and features of embodiments may be combined with each other.

Figure 1:
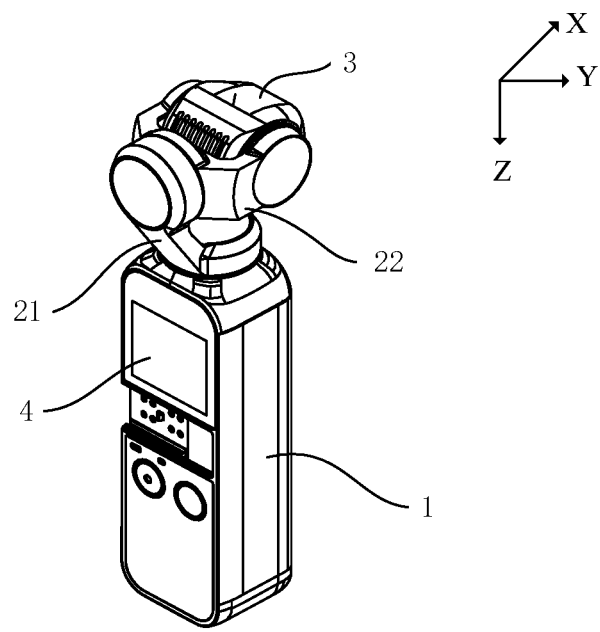
FIG. 1 is a schematic perspective diagram of a handheld gimbal according to some embodiments of the present disclosure.
Figure 2:
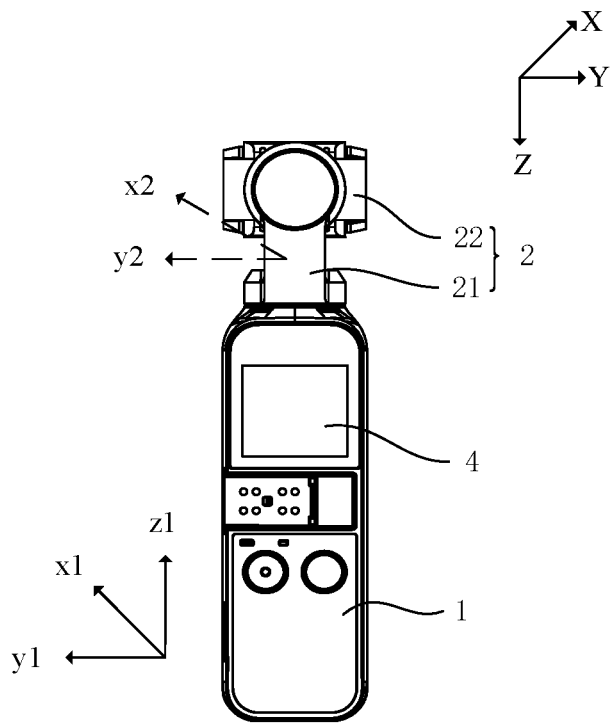
FIG. 2 is a schematic perspective diagram showing the handheld gimbal shown in FIG. 1 being placed upright.

In connection with FIG. 1 and FIG. 2, the handheld gimbal of embodiments of the present disclosure includes a handle 1 and a gimbal 2 arranged at the handle 1. The handheld gimbal is an example of a gimbal device, and the handle 1 is an example of a support member. The gimbal 2 may be configured to carry an imaging device 3 to stabilize the imaging device 3. The gimbal 2 of embodiments of the present disclosure may include a double-axis gimbal or a three-axis gimbal.

In some embodiments, the gimbal 2 may include the three-axis gimbal. In connection with FIG. 1 and FIG. 2, the gimbal 2 includes an outer frame 21, a middle frame 22, and an inner frame. The outer frame 21 may be configured to rotate around a first predetermined direction. The middle frame 22 may be configured to rotate around a second predetermined direction. The inner frame may be configured to rotate around a third predetermined direction. The inner frame may be configured to carry the imaging device 3. In some embodiments, when rotating around the first predetermined direction, the outer frame 21 may drive the middle frame 22 and the inner frame to rotate around the first predetermined direction to drive the imaging device 3 to rotate around the first predetermined direction. when rotating around the second predetermined direction, the middle frame 22 may drive the inner frame to rotate around the second predetermined direction to drive the imaging device 3 to rotate around the second predetermined direction. The inner frame may be configured to rotate around the third predetermined direction to drive the imaging device 3 to rotate around the third predetermined direction.

In some embodiments, the gimbal 2 may include the double-axis gimbal. The gimbal 2 may include an outer frame 21 and an inner frame. The outer frame 21 may be configured to rotate around the first predetermined direction. The inner frame may be configured to rotate around the second predetermined direction or the third predetermined direction. In some embodiments, when rotating around the first predetermined direction, the outer frame 21 may drive the inner frame to rotate around the first predetermined direction to drive the imaging device 3 to rotate around the first predetermined direction. The inner frame may be configured to rotate around the second predetermined direction or the third predetermined direction to drive the imaging device 3 to rotate around the second predetermined direction or the third predetermined direction.

In some embodiments, the first predetermined direction, the second predetermined direction, and the third predetermined direction may be determined according to the structural form of the gimbal 2. For example, in embodiments shown in FIG. 1 and FIG. 2, the gimbal 2 includes the three-axis gimbal. The outer frame 21 may be configured to rotate around a yaw axis. The middle frame 22 may be configured to rotate around a roll axis. The inner frame may be configured to rotate around a pitch axis. The outer frame 21 may include a yaw axis arm and may be driven by a yaw axis motor. The middle frame 22 may include a roll axis arm and be driven by a roll axis motor. The inner frame may include a pitch axis arm and be driven by a pitch axis motor.

The handheld gimbal control method of embodiments of the present disclosure is described below.

Figure 3:
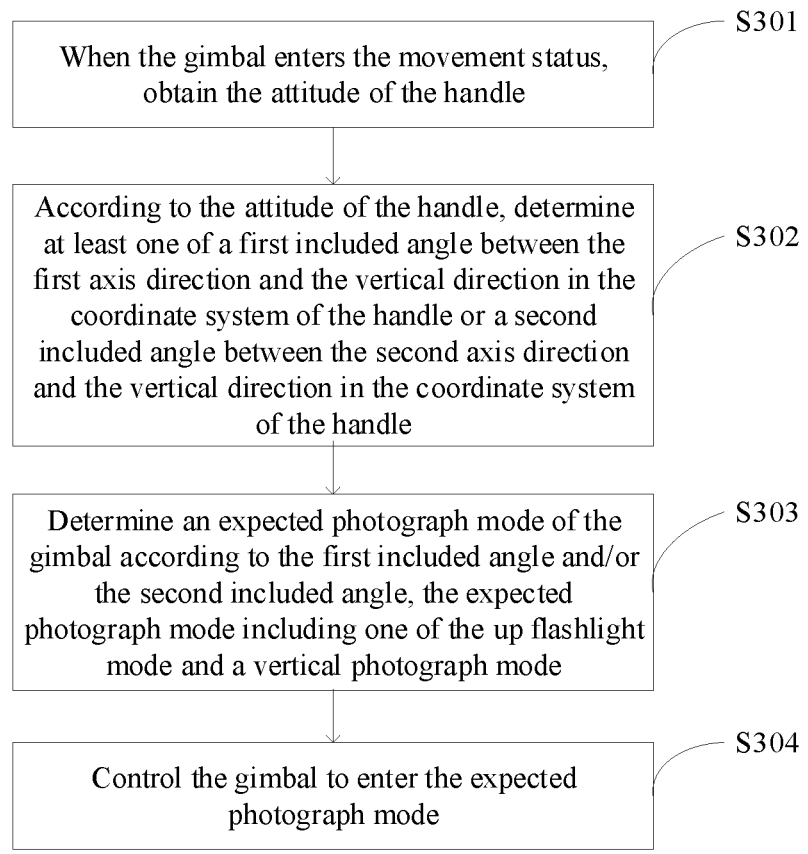
FIG. 3 is a schematic flowchart of a handheld gimbal control method according to some embodiments of the present disclosure.

FIG. 3 is a schematic flowchart of a handheld gimbal control method according to some embodiments of the present disclosure. As shown in FIG. 3, the handheld gimbal control method of embodiments of the present disclosure includes the following processes.

At S301, when the gimbal 2 enters the movement status, the attitude of the handle 1 is obtained.

In some embodiments, if a trigger event used to instruct the gimbal 2 to enter the movement status is detected, the gimbal 2 may be determined to enter the movement status. The trigger event may include one of an event instructing the handheld gimbal to turn on, an event instructing the handheld gimbal to restart, and an event instructing the handheld gimbal to exit a sleep status. The trigger event may be generated by operating a button on the handle 1 or operating the terminal communicating with the handheld gimbal.

For example, the user may want the gimbal 2 to directly enter the vertical photograph mode when the handheld gimbal is turned on. In some embodiments, the handle 1 may be first controlled to be at an attitude corresponding to the vertical photograph mode, then, the power button on the handle 1 may be pressed down. The gimbal 2 may automatically enter the expected attitude corresponding to the vertical photograph mode.

The handheld gimbal of embodiments of the present disclosure may further include an accelerometer. The accelerometer may be configured to detect the gimbal attitude qmesa. The attitude of the handle 1 may be determined according to the gimbal attitude and a gimbal joint angle. The three-axis may be taken as an example. The outer frame 21 may be configured to rotate around the yaw axis. The middle frame 22 may be configured to rotate around the roll axis. The inner frame may be configured to rotate around the pitch axis. The gimbal joint angle may include a yaw joint angle joint_yaw, a roll joint angle joint_roll, and a pitch joint angle joint_pitch. The joint angles may include the joint angles of the motors corresponding to the axes. According to an axis-angle conversion formula, q_yaw, q_roll, and q_pitch are obtained. The conjugate or inverse of q_yaw, q_roll, and q_pitch are q_yaw_inv, q_roll_inv, and q_pitch_inv respectively. The formula of the attitude qhandle of the handle 1 is:

$$q\text{handle}=q\text{mesa}*q\_pitch\_inv*q\_roll\_inv*q\_yaw\_inv \quad (1)$$

where q denotes a quaternion.

At S302, according to the attitude of the handle 1, at least one of a first included angle between the first axis direction and the vertical direction in the coordinate system of the handle 1 or a second included angle between the second axis direction and the vertical direction in the coordinate system of the handle 1 may be determined.

When the handheld gimbal is positioned upright, the first axis direction and the second axis direction may be orthogonal to the vertical direction. In some embodiments, in connection with FIG. 1 and FIG. 2, the handheld gimbal further includes a display 4 arranged at front of the handle 1 and a button (not shown). When the handheld gimbal is positioned upright, the display may face the user, and the lens of the imaging device 3 may face away from the user. FIG. 2 shows a status image when the handheld gimbal is positioned upright.

The first axis direction and the second axis direction may be defined as needed. For example, in some embodiments, when the handheld gimbal is positioned upright, the first axis direction may point to the front of the handle 1, and the second axis direction may point to the left side of the handle 1. As shown in FIG. 2, the first axis direction is x1, and the second axis direction is y1. In some other embodiments, when the handheld gimbal is positioned upright, the first axis direction may point to the front of the handle 1, and the second axis direction may point to the right side of the handle 1. The first axis direction and the second axis direction may also point to another direction, which may be set as needed.

The vertical direction of embodiments of the present disclosure may include a vertical direction in a fixed coordinate system. In some embodiments, the vertical direction may include the Z-axis direction in the world coordinate system, e.g., the Z-axis direction shown in FIG. 1. The vertical direction of embodiments of the present disclosure may be vertical downward. The vertical direction may include the vertical direction or another direction of another fixed coordinate system.

Figure 4:
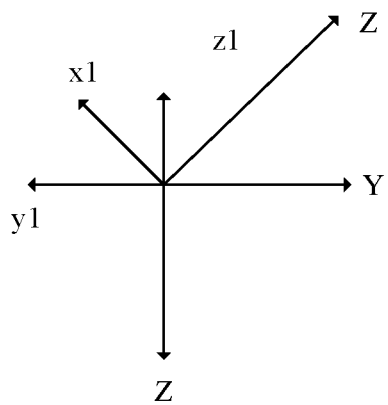
FIG. 4 is a schematic diagram showing a position relationship between a coordinate system of a handle and a world coordinate system when the handheld gimbal shown in FIG. 1 is placed upright.

In some embodiments, when the handheld gimbal is positioned upright, the first axis direction is towards the front of the handle 1, the second axis direction is towards the left side of the handle 1, and the vertical direction is the Z-axis direction of the fixed gimbal coordinate. As shown in FIG. 4, when the handheld gimbal is positioned upright, x1-axis direction, y1-axis direction may be orthogonal to the Z-axis direction. The first axis direction and the second axis direction may be defined as other directions or the vertical direction may be defined to include the vertical direction of another fixed coordinate system or another direction, which are modifications of the present disclosure. The change of the included angle due to the change of the coordinate system may be within the scope of the present disclosure.

At S303, an expected photograph mode of the gimbal 2 is determined according to the first included angle and/or the second included angle. The expected photograph mode includes one of the up flashlight mode and a vertical photograph mode.

In some embodiments, if the first included angle is in a first predetermined angle range, the expected photograph mode of the gimbal 2 may include the up flashlight mode. When whether the handle 1 is at the attitude of the handle 1 corresponding to the up flashlight mode, the up flashlight mode may be caused to include a plurality of corresponding attitudes of the handle 1 by setting the first predetermined angle range. When the handle 1 is at an attitude of any handle 1 corresponding to any one of the up flashlight modes, if the gimbal enters the movement status, the gimbal 2 may directly enter the up flashlight mode to facilitate the gimbal 2 to enter the up flashlight mode.

Figure 5A:
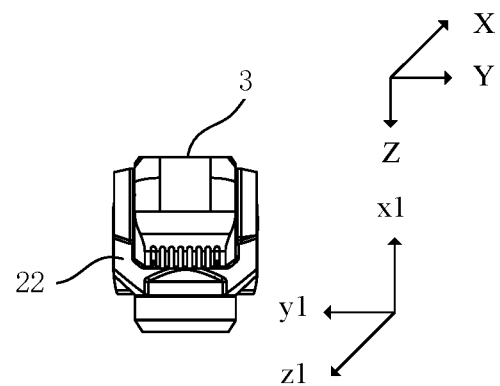
FIG. 5A is a schematic perspective diagram showing the handheld gimbal shown in FIG. 1 in an up flashlight mode.

In some embodiments, the first predetermined angle range may be greater than or equal to 135° and smaller than or equal to 180°. For example, the first included angle may include 135°, 140°, 145°, 150°, 155°, 160°, 165°, 170°, 175°, or 180°. Then, the expected photograph mode of the gimbal 2 may be determined to be the up flashlight mode. FIG. 5A is a schematic perspective diagram showing the handheld gimbal shown in FIG. 1 in an up flashlight mode. As shown in FIG. 5A, the first included angle is 180°.

In some other embodiments, when the first included angle may be set in another value range, e.g., greater than or equal to 160° and smaller than or equal to 180° or the first included angle may include a specific angled, e.g., 180°, the expected photograph mode of the gimbal 2 may be determined to the up flashlight mode.

The vertical photograph mode of embodiments of the present disclosure may include at least one of a down vertical photograph mode or the up vertical photograph mode.

In some embodiments, if the second included angle is located in a second predetermined angle range, the expected photograph mode of the gimbal 2 may be determined to the down vertical photograph mode. When whether the handle 1 includes the handle 1 corresponding to the down vertical photograph mode is determined, the down vertical photograph may be caused to include a plurality of attitudes of the plurality of corresponding handle 1 by setting a third predetermined angle range. When the handle 1 is at the attitude of the handle 1 corresponding to a next vertical photograph mode, if the gimbal 2 enters the movement status, the gimbal 2 may directly enter the down vertical photograph mode to facilitate controlling the gimbal 2 to enter the down vertical mode.

Figure 5B:
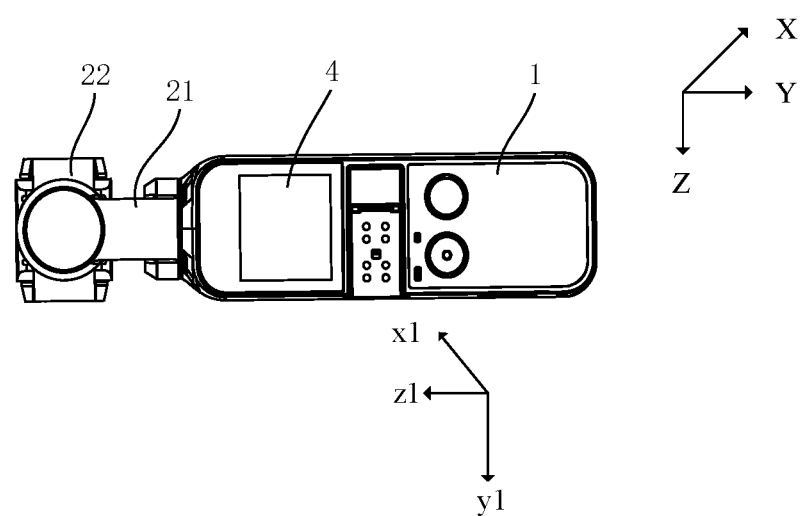
FIG. 5B is a schematic perspective diagram showing the handheld gimbal shown in FIG. 1 in a down vertical photograph mode.
Figure 5C:
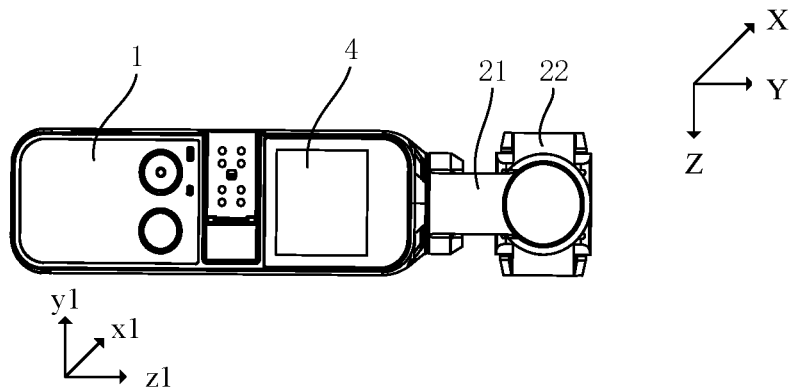
FIG. 5C is a schematic perspective diagram showing the handheld gimbal shown in FIG. 1 in an up vertical photograph mode.

In some embodiments, the third predetermined angle range may be greater than or equal to 135° and smaller than or equal to 180°. For example, the second included angle may include 135°, 140°, 145°, 150°, 155°, 160°, 165°, 170°, 175°, or 180°. Then, the expected photograph mode of the gimbal 2 may be determined to the up vertical photograph mode. FIG. 5C is a schematic perspective diagram showing the handheld gimbal shown in FIG. 1 in the up vertical photograph mode. As shown in FIG. 5C, the second included angle is 180°. The lens of the imaging device 3 faces the direction of arrow A2 shown in FIG. 5C.

In some other embodiments, when the second included angle is set to be in another value range, e.g., greater than or equal to 160° and smaller than or equal to 180° or the second included angle includes a specific angle, e.g., 180°, the expected photograph mode of the gimbal 2 may be determined to be the up vertical photograph mode.

In some embodiments, detecting the first included angle and the second included angle simultaneously (S303) includes determining whether the first included angle is in the first predetermined angle range and the second included angle is in the second predetermined angle range or the third predetermined angle range to determine the expected photograph mode of the gimbal 2. The manner of detecting the first included angle and the second included angle simultaneously and then, determining the expected photograph mode of the gimbal 2 according to the first included angle and the second included angle may include a special situation of being not able to determine the expected photograph mode of the gimbal 2 when the first included angle and the second included angle includes some angles. For example, the first included angle is 135°, and the second included angle is 135°. That is, when a same end point value may exist in different angle ranges, the expected photograph mode of the gimbal 2 may include the up flashlight mode or the down vertical photograph mode.

To solve the problem that when the first included angle and the second included angle include some angles, the expected photograph mode of the gimbal 2 cannot be determined, in some other embodiments, a sequence detection may be performed on the included angles as follows.

Whether the first included angle is in the first predetermined angle range may be detected. If yes, the expected photograph mode of the gimbal 2 may be determined according to the second included angle. In some other embodiments, whether the second included angle is in the second predetermined angle range or the third predetermined angle range may be detected. If no, the expected photograph mode of the gimbal 2 may be detected according to the first included angle.

In addition, in some embodiments, when the gimbal 2 enters the movement status, in addition, to directly enter the up flashlight mode or the vertical photograph mode, the gimbal 2 may further directly enter the down flashlight mode, a forward mode, or a reverse mode. That is, the expected photograph mode may include one of the up flashlight mode, the vertical photograph mode, the down flashlight mode, the forward mode, and the reverse mode.

The down flashlight mode may be determined according to the first included angle between the first axis direction and the vertical direction in the coordinate system of the handle 1. In some embodiments, if the first included angle is in a fourth predetermined angle range, the expected photograph mode of the gimbal 2 may be determined to be the down flashlight mode. When whether the handle 1 is at the attitude of the handle 1 corresponding to the down flashlight mode is determined, the down flashlight mode may be caused to include the plurality of corresponding attitudes of the handle 1 by setting the second predetermined angle range. When the handle 1 is at the attitude of the handle 1 corresponding to the next down flashlight mode, if the gimbal 2 enters the movement status, the gimbal 2 may directly enter the flashlight mode to facilitate controlling the gimbal 2 to enter the down flashlight mode.

Figure 5D:
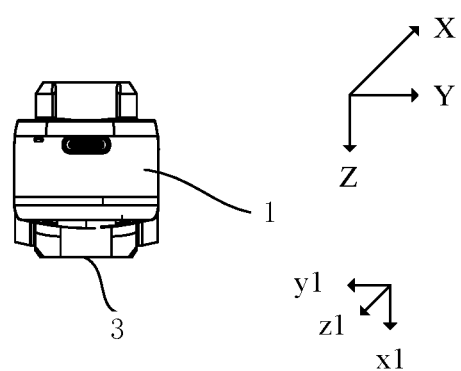
FIG. 5D is a schematic perspective diagram showing the handheld gimbal shown in FIG. 1 in a down flashlight mode.

In some embodiments, the fourth predetermined angle range may be smaller than or equal to 45 and greater than 0°. For example, the first included angle may include 0°, 5°, 10°, 15°, 20°, 25°, 30°, 35°, 40°, or 45°. The expected photograph mode of the gimbal 2 may be determined to be the down flashlight mode. FIG. 5D is a schematic perspective diagram showing the handheld gimbal shown in FIG. 1 in the down flashlight mode. As shown in FIG. 5D, the first included angle is 0°.

In some other embodiments, when the first included angle is set to another value range, e.g., greater than or equal to 0° and smaller than or equal to 30° or is a specific angle, e.g., 0°, the expected photograph mode of the gimbal 2 may be determined to be the down flashlight mode.

In some embodiments, the forward photograph mode or the reverse photograph mode may be determined according to a third included angle between a seventh axis direction and the vertical direction in the coordinate system of the handle 1. When the handheld gimbal is positioned upright, the seventh axis direction may be parallel to the vertical direction.

The seventh axis direction may be defined as needed. For example, in some embodiments, when the handheld gimbal is positioned upright, the seventh axis direction may point downward of the handle 1. As shown in FIG. 2, z1 is the seventh axis direction. In some other embodiments, the seventh axis direction may be defined as follows. When the handheld gimbal is positioned upright, the seventh axis direction may be parallel to the vertical direction. In some embodiments, the seventh axis direction may point downward of the handle 1.

An example that when the handheld gimbal is positioned upright, the seventh axis direction may point downward of the handle 1 is described below.

In some embodiments, if the third included angle is in a fifth predetermined angle range, the expected photograph mode of the gimbal 2 may be determined to the forward photograph mode. When whether the handle 1 is at the attitude of the handle 1 corresponding to the forward photograph mode, the forward photograph mode may be caused to include a plurality of corresponding attitudes of the handle 1 by setting the fifth predetermined angle range. When the handle 1 is at the attitude of the handle 1 corresponding to any forward photograph mode, if the gimbal 2 enters the movement status, the gimbal 2 may directly enter the forward photograph mode, which facilitates controlling the gimbal 2 to enter the forward photograph mode.

In some embodiments, the fifth predetermined angle range may be greater than or equal to 135° and smaller than or equal to 180°. For example, the third included angle may include 135°, 140°, 145°, 150°, 155°, 160°, 165°, 170°, 175°, or 180°. The expected photograph mode of the gimbal 2 may be determined to be the forward photograph mode. FIG. 2 is a schematic perspective diagram showing the handheld gimbal shown in FIG. 1 entering the forward photograph mode. As shown in FIG. 2, the third included angle is 180°, and the lends of the imaging device 3 faces to the back of the handle 1.

In some other embodiments, when the third included angle is set to another value range, e.g., greater than or equal to 160° and smaller than or equal to 180° or the third included angle includes a specific angle, e.g., 180°, the expected photograph mode of the gimbal 2 may be determined to be the forward photograph mode.

In some embodiments, if the third included angle is in a sixth predetermined angle range, the expected photograph mode of the gimbal 2 may be determined to be the reverse photograph mode. When whether the handle 1 is at the attitude of the handle 1 corresponding to the reverse photograph mode, the reverse photograph mode may be caused to include a plurality of corresponding attitudes of the handle 1 by setting the sixth predetermined angle range. When the handle 1 is at the attitude of the handle 1 corresponding to any reverse photograph mode, if the gimbal 2 enters the movement status, the gimbal 2 may directly enter the reverse photograph mode, which facilitates controlling the gimbal 2 to enter the reverse mode.

Figure 5E:
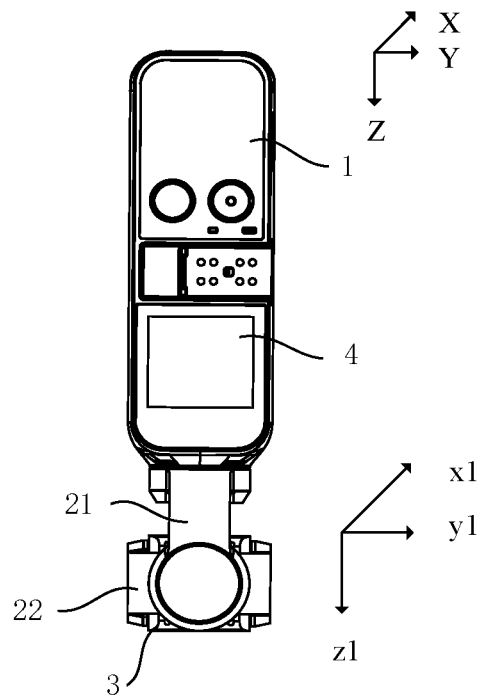
FIG. 5E is a schematic perspective diagram showing the handheld gimbal shown in FIG. 1 in a reverse photograph mode.

In some embodiments, the sixth predetermined angle range may be smaller than or equal to 45° and greater than or equal to 0°. For example, the third included angle may include 0°, 5°, 10°, 15°, 20°, 25°, 30°, 35°, 40°, or 45°. The expected photograph mode of the gimbal 2 may be determined to be the reverse photograph mode. FIG. 5E is a schematic perspective diagram showing the handheld gimbal shown in FIG. 1 in the reverse photograph mode. As shown in FIG. 5E, the third included angle is 0°, and the lends of the imaging device 3 faces to the back of the handle 1.

In some other embodiments, when the third included angle is set to another value range, e.g., greater than or equal to 0° and smaller than or equal to 30° or the third included includes a specific angle, e.g., 0°, the expected photograph mode of the gimbal 2 may be determined to be the reverse photograph mode.

In some embodiments, the first included angle, the second included angle, and the third included angle may be detected simultaneously. Determining the expected photograph mode of the gimbal according to the first included angle and/or the second included angle includes determining whether the first included angle is in the first predetermined angle range or the fourth predetermined angle range, the second included angle is in the second predetermined angle range or the third predetermined angle range, and the third included angle is in the fifth predetermined angle range or the sixth predetermined angle range to determine the expected photograph mode of the gimbal 2. However, the manner of detecting the first included angle, the second included angle, and the third included angle simultaneously and then, determining the expected photograph mode of the gimbal according to the first included angle, the second included angle, and the third included angle may include a special situation that the expected photograph mode of the gimbal 2 cannot be determined when the first included angle, the second included angle, and the third included angle include some angles. For example, the first angle is 135°, and the second included angle is also 135°. That is, when the same end point value exists in the different angle ranges, the expected photograph mode of the gimbal 2 may include the up flashlight mode or the down vertical photograph mode.

To solve the problem that when the first included angle, the second included angle, and the third included angle are some angles, the expected photograph mode of the gimbal cannot be determined, in some other embodiments, the sequence detection may be performed on the included angles. The detection sequence of the included angles may change. However, the target angle range of the photograph modes may not change.

In some embodiments, the photograph mode of the gimbal may include the forward photograph mode, the reverse photograph mode, the up flashlight mode, the down flashlight mode, the up vertical photograph mode, and the down vertical photograph mode. The expected photograph mode may include one of the forward photograph mode, the reverse photograph mode, the up flashlight mode, the down flashlight mode, the up vertical photograph mode, and the down vertical photograph mode. A first target angle may be set to one of the first included angle, the second included angle, and the third included angle. A second target angle may be set to one of the first included angle, the second included angle, and the third included angle. A third target angle may be set to one of the first included angle, the second included angle, and the third included angle. Determining the expected photograph mode of the gimbal 2 according to the first included angle and/or the second included angle includes detecting whether the first target angle is in the first target angle range. If not, whether the second target angle is in the second target angle range may be detected. If not, the expected photograph mode of the gimbal 2 may be determined according to the third target angle.

In some embodiments, the first target angle range may be greater than or equal to 0° and smaller than or equal to 45°, or the first target angle range may be greater than or equal to 135° and smaller than or equal to 180°. The second target angle range may be greater than or equal to 0° and smaller than or equal to 45°, or the second target angle range may be greater than or equal to 135° and smaller than or equal to 180°. The third target angle range may be from 0° to 180°.

Further, after whether the first target angle is in the first target angle range is detected, if the first target angle is in the first target angle range, the expected photograph mode of the gimbal 2 may be determined according to the first target angle. In some embodiments, the first target angle may include the third included angle. When the first target angle range is greater than or equal to 0° and smaller than or equal to 45°, the expected photograph mode may be the reverse photograph mode. When the first target angle range is greater than or equal to 135° and smaller than or equal to 180°, the expected photograph mode may be the up vertical photograph mode.

Further, the third target angle may include the first included angle. When the third target angle range is smaller than or equal to 90°, the expected photograph mode may include the down flashlight mode. When the third target angle range is greater than 90°, the expected photograph mode is the up flashlight mode.

At S304, the gimbal 2 is controlled to enter the expected photograph mode.

In some embodiments, controlling the gimbal 2 to enter the expected photograph mode includes according to the expected photograph mode, determining a first position relationship between the vertical direction and a first specific plane in the coordinate system of the imaging device 3 carried by the gimbal 2, and then controlling the gimbal 2 to rotate to cause the imaging device 3 to satisfy the first position relationship. The first specific plane may be formed based on a third axis direction and a fourth axis direction in the coordinate system of the imaging device 3. When the imaging device 3 is positioned upright, the third axis direction and the fourth axis direction may be perpendicular to the vertical direction. In some embodiments, when the imaging device 3 is positioned upright, the lens of the imaging device 3 faces away from the user, as shown in FIG. 2.

The third axis direction and the fourth axis direction may be defined as needed. For example, in some embodiments, when the imaging device 3 is positioned upright, the third axis direction may point to the front of the imaging device 3 (i.e., the orientation of the lens). The fourth axis direction may point to the left side of the imaging device 3. The third axis direction and the fourth axis direction may include other directions. For example, the third axis direction may point to the back of the imaging device 3, and the fourth axis direction may point to the left side of the imaging device 3, which can be set as needed.

In some embodiments, when the expected photograph mode includes the vertical photograph mode, the first position relationship may include that the first specific plane of the imaging device 3 carried by the gimbal 2 in the coordinate system may be almost parallel to the vertical direction.

When the expected photograph mode includes the vertical photograph mode, in addition to the above content, the first position relationship may include, for example, that the first specific plane of the imaging device 3 carried by the gimbal 2 in the coordinate system may have an included angle with the vertical direction, which may be set as needed. In some embodiments, the user may define the first position relationship.

In some embodiments, when the expected photograph mode includes the up flashlight mode, the first position relationship may include that the first specific plane of the imaging device 3 carried by the gimbal 2 in the coordinate system may be perpendicular to the vertical direction.

When the expected photograph mode includes the up flash light mode, in addition to the above-described content, the first position relationship may include, for example, the first position relationship may include that the first specific plane of the imaging device 3 carried by the gimbal 2 in the coordinate system may have a certain included angle with the vertical direction, which may be set as needed. In some embodiments, the user may define the first position relationship. In some embodiments, the first position relationship may be determined according to the first included angle, that is, the included angle between the first specific plane and x1 may include a fixed angle. Thus, based on the first included angle, the included angle between the first specific plane and the vertical direction may be determined. Therefore, according to the included angle between the first specific plane and the vertical direction, the first position relationship may be determined.

Figure 6A:
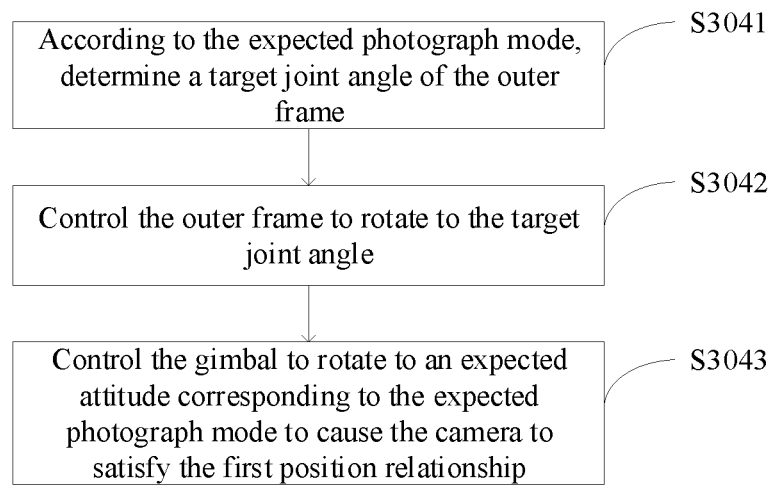
FIG. 6A is a schematic specific flowchart of the handheld gimbal control method shown in FIG. 3.

Controlling the gimbal 2 to rotate to cause the imaging device 3 to satisfy the first position relationship includes processes S3041 to S3043 as shown in FIG. 6A.

At S3041, according to the expected photograph mode, a target joint angle of the outer frame 21 may be determined.

In some other embodiments, when the target joint angle of the outer frame 21 is determined, according to the expected photograph mode, a second position relationship between the vertical direction and a second specific plane of the outer frame 21 in the coordinate system and the vertical direction may be determined first and then the target joint angle of the outer frame 21 may be determined according to the second position relationship. The second specific plane may be formed based on a fifth axis direction and a sixth axis direction of the outer frame 21 in the coordinate system. When the handheld gimbal is positioned upright, the fifth axis direction and the sixth axis direction may be orthogonal to the vertical direction.

The fifth axis direction and the sixth axis direction may be defined as needed. For example, in some embodiments, when the handheld gimbal is positioned upright, the fifth axis direction may point to the front or back of the outer frame 21. The sixth axis direction may point to the left side or right side of the outer frame 21.

The second position relationship may include that a projection of the vertical direction on the second specific plane is on the axis corresponding to the fifth axis direction or on the axis corresponding to the sixth axis direction. Whether the projection of the vertical direction on the second specific plane is on the axis corresponding to the fifth axis direction or the sixth axis direction depends on how to define the fifth axis direction and the sixth axis direction in the coordinate system of the outer frame 21.

In some embodiments, when the expected photograph mode includes the up vertical photograph mode, the projection of the vertical direction on the second specific plane may point to a same direction of the sixth axis direction. The vertical photograph mode may include the down vertical photograph mode. When the expected photograph mode includes the down vertical photograph mode, the projection of the vertical direction on the second specific plane may point to an opposite direction of the sixth axis direction. In some other embodiments, when the expected photograph mode includes the up vertical photograph mode, the projection of the vertical direction on the second specific plane may point to the opposite direction of the sixth axis direction. The vertical photograph mode may include the down vertical photograph mode. When the expected photograph mode includes the down vertical photograph mode, the projection of the vertical direction on the second specific plane may point to the same direction of the sixth axis direction. When the expected photograph mode includes the up vertical photograph mode or the down vertical photograph mode, the orientation relationship of the projection of the vertical direction on the second specific plane and the sixth axis direction may be further determined according to the definition of the vertical direction and the sixth axis direction. When the vertical direction is the Z-axis direction in the world coordinate system, and the handheld gimbal is positioned upright, the projection of the Z-axis direction on the second specific plane may point to the opposite direction of the sixth axis direction. The vertical photograph mode may include the down vertical photograph mode. When the expected photograph mode includes the down vertical photograph mode, the projection of the Z-axis direction on the second specific plane may point to the same direction of the sixth axis direction.

When the expected photograph mode includes the up flashlight mode, the projection of the vertical direction on the second specific plane may point to a same or an opposite direction of the fifth axis direction. When the expected photograph mode includes the up flashlight mode, the orientation relationship between the projection of the vertical direction on the second specific plane and the fifth axis direction may be further determined according to the definition of the vertical direction and the fifth axis direction. When the vertical direction is the Z-axis direction in the world coordinate system and the handheld gimbal is positioned upright, the sixth axis direction pointing to the left side of the outer frame 21 may be taken as an example for description. When the expected photograph mode includes the up flashlight mode, the projection of the Z-axis direction on the second specific plane may point to the opposite direction of the fifth axis direction.

How to determine the target joint angle of the outer frame 21 according to the second position relationship is described in detail below.

In some embodiments, a rotation direction (e.g., counterclockwise) from the fifth axis direction to the sixth axis direction may be defined as a positive direction. A rotation direction (e.g., clockwise) from the sixth axis direction to the fifth axis direction may be defined as a negative direction. By taking the placement position of the handheld gimbal 2 shown in FIG. 2 as an example, the joint angle of the outer frame 21 of the gimbal 2 shown in FIG. 2 is defined as 0°. The fifth axis direction x2 of the coordinate system of the outer frame 21 may point to the front of the outer frame 21, that is, point to the user. The sixth axis direction y2 may point to the left side of the outer frame 21. The second specific plane may include the plane formed by x2 and y2. The vertical direction may include the gravity direction, that is, a direction opposite to the Z-axis direction of the world coordinate system. In addition, taking the coordinate system of FIG. 6B as an example, a rotation area of the outer frame 21 includes a forward rotation area (i.e., counterclockwise rotation about x2) and a reverse rotation area (i.e., clockwise rotation about x2). x2 may be used as a boundary line of the joint angle 0° of the outer frame 21. For the counterclockwise rotation, θ is greater than 0, otherwise, θ is smaller than 0.

Figure 6B:
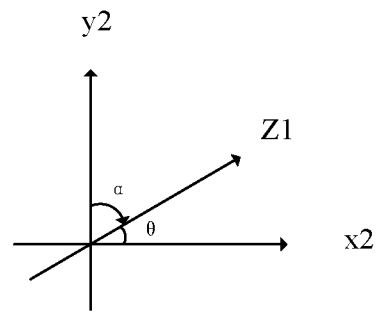
FIG. 6B is a schematic diagram showing a position relationship between a vertical direction and a coordinate system of an outer frame when the handle attitude indicates that an expected photograph mode includes the down vertical photograph mode in the handheld control method shown in FIG. 6A.

When the expected photograph mode includes the down vertical photograph mode, the second position relationship may include that the projection Z1 of the gravity direction on the plane formed by x2 and y2 may point to the same direction of the sixth axis direction y2. As shown in FIG. 6B, assume that the expected photograph mode includes the down vertical photograph mode, the position relationship between Z1 and x2 and y2 is shown in the figure, and an included angle between Z1 and x2 is 0. To satisfy the second position relationship, the outer frame 21 may need to be controlled to rotate to cause y2 to be coincident with Z1 and to point to the same direction of Z1. Therefore, the target joint angle α=−(90°-θ), the outer frame 21 may need to be controlled to rotate (90°-θ) clockwise.

Figure 6C:
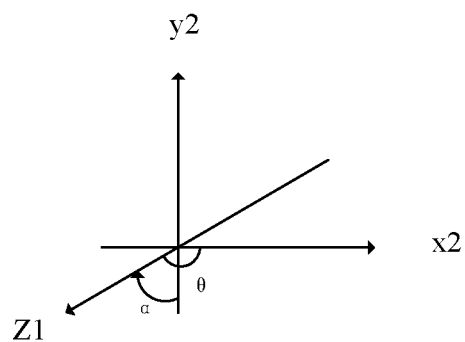
FIG. 6C is a schematic diagram showing a position relationship between the vertical direction and the coordinate system of the outer frame when the handle attitude indicates that the expected photograph mode includes the up vertical photograph mode in the handheld control method shown in FIG. 6A.

When the expected photograph mode includes the up vertical photograph mode, the second position relationship may include that the projection Z1 of the gravity direction on the plane formed by x2 and y2 may point to the different direction of the sixth axis direction y2. As shown in FIG. 6C, assume that the expected photograph direction includes the down vertical photograph mode, the position relationship between Z1 and x2 and y2 is shown in the figure, and an included angle between Z1 and x2 is 0. To satisfy the second position relationship, the outer frame 21 may need to be controlled to rotate to cause y2 to be coincident with Z1 and to point to the opposite direction of Z1. Therefore, the target joint angle α=90°+0, the outer frame 21 may need to be controlled to rotate (90°+θ) clockwise.

Figure 6D:
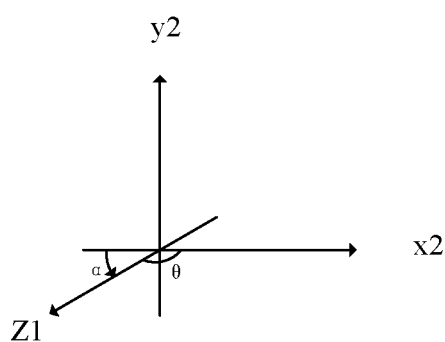
FIG. 6D is a schematic diagram showing a position relationship between the vertical direction and the coordinate system of the outer frame when the handle attitude indicates that the expected photograph mode includes the up flashlight mode according to a specific embodiment of the handheld control method shown in FIG. 6A.
Figure 6E:
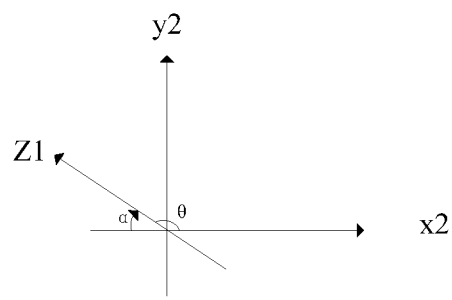
FIG. 6E is a schematic diagram showing a position relationship between the vertical direction and the coordinate system of the outer frame when the handle attitude indicates that the expected photograph mode includes the up flashlight mode according to a specific embodiment of the handheld control method shown in FIG. 6A.

In some embodiments, when the expected photograph mode includes the up flashlight mode, the second position relationship may include that the projection Z1 of the gravity direction on the plane formed by x2 and y2 may point to the opposite direction of the fifth axis direction x2. As shown in FIG. 6D, assume that the expected photograph direction includes the up flashlight mode, the position relationship between Z1 and x2 and y2 is shown in the figure, and the included angle between Z1 and x2 is θ. To satisfy the second position relationship, the outer frame 21 may need to be controlled to rotate to cause x2 to be coincident with Z1 and to point to the opposite direction of Z1. Therefore, the target joint angle α=180°+θ, and the outer frame 21 may need to be controlled to rotate (180°+θ) counterclockwise. In some other embodiments, when the expected photograph mode includes the up flashlight mode, the second position relationship may include that the projection Z1 of the gravity direction on the plane formed by x2 and y2 may point to the opposite direction of the fifth axis direction x2. As shown in FIG. 6E, assume that the expected photograph direction includes the up flashlight mode, the position relationship between Z1 and x2 and y2 is shown in the figure, and the included angle between Z1 and x2 is θ. To satisfy the second position relationship, the outer frame 21 may need to be controlled to rotate to cause x2 to be coincident with Z1 and to point to the opposite direction of Z1. Therefore, the target joint angle α=−180°+θ, and the outer frame 21 may need to be controlled to rotate (−180°+θ) clockwise.

At S3042, the outer frame 21 is controlled to rotate to the target joint angle.

In some embodiments, controlling the outer frame 21 to rotate to the target joint angle includes controlling the corresponding motor to rotate to the target joint angle.

In some embodiments, when the gimbal 2 enters the movement status, the gimbal 2 may perform self-detection to rotate the joint angle of the outer frame 21 to a first predetermined joint angle, e.g., 0°. In process S3042, the outer frame 21 is controlled to rotate from the first predetermined joint angle to the target joint angle.

In some embodiments, the gimbal 2 further includes the middle frame 22 connected to the outer frame 21 and the inner frame connected to the middle frame. The inner frame may be configured to carry the imaging device 3. The middle frame 22 may be configured to rotate around a second predetermined direction. The inner frame may be configured to rotate around a third predetermined direction. While the outer frame 21 is controlled to rotate to the target joint angle, the joint angle of the middle frame 22 may be controlled to be the first predetermined angle, and the joint angle of the inner frame may be controlled to be the second predetermined angle. In some embodiments, the first predetermined angle may include the joint angle of the middle frame 22 when the gimbal 2 enters the movement status. The second predetermined angle may include the joint angle of the inner frame when the gimbal 2 enters the movement status. In some embodiments, during rotating the outer frame 21 to the target joint angle, the joint angles of the middle frame 22 and the inner frame may be locked at the joint angles of the middle frame 22 and the inner frame when the gimbal 2 enters the movement status. In some embodiments, when the gimbal 2 enters the movement status, the gimbal 2 may perform self-inspection to rotate the joint angle of the middle frame 22 to the second predetermined joint angle, e.g., 0°, and/or the joint angle of the inner frame to the third predetermined joint angle, e.g., 0°. In some embodiments, the first predetermined angle may include the second predetermined joint angle. the second predetermined angle may include the third predetermined joint angle. If the second predetermined joint angle is 0°, and the third predetermined joint angle is also 0°, the first predetermined angle and the second predetermined angle are 0°. During rotating outer frame 21 to the target joint angle, the joint angles of the middle frame 22 and the inner frame are locked at 0°.

In some other embodiments, the gimbal 2 may further include the inner frame connected to the outer frame 21. The inner frame may be configured to carry the imaging device 3. The inner frame may be configured to rotate around the second predetermined direction or the third predetermined direction. While the outer frame 21 is controlled to rotate to the target joint angle, the joint angle of the inner frame may be controlled to be the third predetermined angle. In some embodiments, the third predetermined angle may include the joint angle of the inner frame when the gimbal 2 enters the movement status. In some embodiments, during rotating the outer frame 21 to the target joint angle, the joint angle of the inner frame may be locked at the joint angle of the inner frame when the gimbal 2 enters the movement status. In some embodiments, when the gimbal 2 enters the movement status, the gimbal 2 may perform self-inspection to rotate the joint angle of the inner frame to the joint angle of the fourth predetermined joint angle, e.g., 0°. In some embodiments, the third predetermined angle may include the fourth predetermined joint angle. If the fourth predetermined joint angle is 0°, the third predetermined angle may be 0°. During rotating the outer frame 21 to the target joint angle, the joint angle of the inner frame is locked at 0°.

In some embodiments, the outer frame 21 may be controlled to rotate to the target joint angle to lock the joint angles of the middle frame 22 and the inner frame. In some other embodiments, the outer frame 21 may be controlled to rotate to the target joint angle, and locking the joint angle of the inner frame may be referred to as the joint angle closed-loop control.

At S3043, the gimbal 2 is controlled to rotate to an expected attitude corresponding to the expected photograph mode to cause the imaging device 3 to satisfy the first position relationship.

For the description of the first position relationship, a reference may be made to relevant parts of embodiments of the present disclosure, which is not repeated here. The expected attitude corresponding to the expected photograph mode may include the gimbal attitude when the imaging device 3 satisfies the first position relationship.

An attitude component corresponding to the outer frame 21 in the expected attitude may include the attitude when the outer frame 21 is rotated to the target joint angle. The gimbal attitude may be detected by the accelerometer when the outer frame 21 rotates to the target joint angle. According to the gimbal attitude when the outer frame 21 rotates to the target joint angle, the attitude of the outer frame 21 may be determined when the outer frame 21 rotates to the target joint angle. For example, when the outer frame 21 is configured to rotate around the yaw axis, the attitude when the outer frame 21 rotates to the target joint angle may include the attitude component of the gimbal attitude of the gimbal 2 corresponding to the yaw axis. In some embodiments, after the outer frame 21 is controlled to rotate to the target joint angle, the current attitude of the gimbal 2 may not satisfy the first position relationship between the expected photograph mode. Taking the three-axis gimbal as an example, the attitude of another frame may need to be further controlled to cause the attitude of the gimbal 2 to satisfy the first position relationship.

In some embodiments, after the gimbal 2 rotates relative to the handle 1, the structural form of the gimbal 2 may change, by taking the gimbal 2 as the three-axis gimbal as an example. As shown in FIG. 2, when the handheld gimbal is positioned upright, the outer frame 21 is configured to rotate around the yaw axis, the middle frame 22 is configured to rotate around the roll axis, and the inner frame is configured to rotate around the pitch axis. As shown in FIGS. 5B and 5C, when the expected photograph mode includes the vertical photograph mode, the outer frame 21 is configured to rotate around the pitch axis, the middle frame 22 is configured to rotate around the roll axis, and the inner frame is configured to rotate around the yaw axis. As shown in FIG. 5A, when the expected photograph mode includes the up flashlight mode, the outer frame 21 is configured to rotate around the roll axis, the middle frame 22 is configured to rotate around the yaw axis, and the inner frame is configured to rotate around the pitch axis.

To cause the gimbal 2 to satisfy the first position relationship, when the expected photograph mode includes the vertical photograph mode, the gimbal 12 may be configured to rotate around the roll axis. Controlling the gimbal 2 to rotate to the expected attitude corresponding to the expected photograph mode includes determining the attitude component of the gimbal 2 corresponding to the roll axis according to the expected photograph mode, controlling the gimbal 2 according to the attitude component of the corresponding roll axis to cause the gimbal 2 to rotate to the expected attitude corresponding to the expected photograph mode. For example, the gimbal 2 may include the three-axis gimbal. The outer frame 21 may be configured to rotate around the yaw axis, the middle frame 22 may be configured to rotate around the roll axis, and the inner frame may be configured to rotate around the pitch axis. For example, assume under the gimbal attitude shown in FIG. 2, an euler angle of the attitude of the gimbal 2 corresponding to the roll axis is 0°. In some embodiments, controlling the attitude component of the roll axis may include controlling the euler angle of the attitude of the gimbal 2 corresponding to the roll axis to be 0°, that is, controlling the middle frame to rotate. After the joint angle closed-loop control is ended for the outer frame 21, the attitude closed-loop control may be performed. That is, the gimbal 2 may be controlled according to the attitude component of the roll axis corresponding to the vertical photograph mode. That is, only the attitude of the middle frame 22 may be controlled, but the attitudes of the outer frame 21 and the inner frame may remain unchanged until the joint angle closed-loop control ends. Thus, the gimbal 2 may satisfy the first position relationship corresponding to the vertical photograph mode. The attitude change of the outer frame 21 and the inner frame caused by the attitude closed loop may be compensated by the attitude closed loop. In some embodiments, after the adjustment of the attitude of the middle frame 22 is ended, the attitudes of the outer frame 21 and the inner frame may be slightly adjusted to cause the gimbal 2 to satisfy the first position relationship corresponding to the vertical photograph mode.

When the euler angle of the attitude of the gimbal 2 corresponding to the roll axis is 0°, the imaging device may be configured to be arranged horizontally. When the expected photograph mode is the up vertical photograph mode, the euler angle of the attitude of the gimbal 2 corresponding to the roll axis may be controlled to be −90°. When the expected photograph mode includes the down vertical photograph mode, the euler angle of the attitude of the gimbal 2 corresponding to the roll axis may be controlled to be 90°.

When the expected photograph mode includes the up flashlight mode, the gimbal 2 may be configured to rotate around the pitch axis. Controlling the attitude of the gimbal 2 to be the expected attitude includes determining the attitude component of the pitch axis corresponding to the gimbal 2 according to the expected photograph mode, and controlling the gimbal 2 according to the attitude component of the corresponding pitch axis to cause the gimbal 2 to rotate to the expected attitude corresponding to the expected photograph mode. For example, the gimbal 2 may include the three-axis gimbal. the outer frame 21 may be configured to rotate around the yaw axis, the middle frame 22 may be configured to rotate around the roll axis, and the inner frame may be configured to rotate around the pitch axis. For example, under the attitude of the gimbal 2 shown in FIG. 2, the euler angle of the attitude of the gimbal 2 corresponding to the pitch axis is 180°. In some embodiments, controlling the attitude component of the pitch axis includes controlling the euler angle of the attitude of the gimbal 2 corresponding to the pitch axis to be 180°, that is, controlling the inner frame to rotate. After the joint angle closed control for the outer frame 21 is ended, the attitude closed-loop control may be then performed. That is, the gimbal 2 may be controlled according to the attitude component of the pitch axis corresponding to the up flashlight mode. That is, the attitude control may be only performed on the inner frame, but the attitudes of the outer frame 21 and the middle frame 22 may remain unchanged until the joint angle closed loop is ended. Thus, the gimbal 2 may satisfy the first position relationship corresponding to the up flashlight mode. The attitude change of the outer frame 21 and the middle frame 22 caused by the attitude closed loop may be compensated by the attitude closed loop. After the attitude adjustment for the inner frame is ended, the attitudes of the outer frame 21 and the middle frame 22 may be slightly adjusted to cause the gimbal 2 to satisfy the first position relationship corresponding to the up flashlight mode.

In some embodiments, to cause the gimbal 2 to satisfy the first position relationship, when the expected photograph mode includes the up flashlight mode, controlling the gimbal 2 to rotate to the expected attitude corresponding to the expected photograph mode includes controlling the joint angle of the frame that is configured to rotate around the pitch axis in the gimbal 2 to be the predetermined joint angle. Taking the three-axis gimbal shown in FIG. 2 as an example, assume that the outer frame 21 is controlled to rotate to the target joint angle, if the inner frame is configured to rotate around the pitch axis, the joint angle corresponding to the inner frame may be controlled to be the predetermined joint angle, e.g., 0° (joint angle corresponding to the inner frame shown in FIG. 2).

In some embodiments, after the gimbal 2 is controlled to enter the expected photograph mode, when the expected photograph mode includes the vertical photograph mode, the gimbal 2 may be configured to rotate around the pitch axis for an angle range of 0° to 45° at the predetermined joint angle position. For example, after the gimbal 2 is controlled to enter the expected photograph mode, the gimbal 2 may be configured to rotate around the pitch axis for 0°, 5°, 10°, 15°, 20°, 25°, 30°, 35°, 40°, or 45° at the predetermined joint angle position. The predetermined joint angle position may include a joint angle position of the pitch axis corresponding to the gimbal 2 when the gimbal 2 enters the expected photograph mode to satisfy user photograph needs. For example, when the gimbal 2 is controlled to enter the vertical photograph mode, the joint angle position of the pitch axis corresponding to the gimbal 2 may include the joint angle position of the outer frame 21. The outer frame 21 may be rotated around the pitch axis for 0° to 45° to cause the gimbal 2 to enter the vertical photograph mode. Thus, the imaging device 3 may capture pictures of different fields of view.

In some embodiments, after the gimbal 2 is controlled to enter the expected photograph mode, when the expected photograph mode includes the up flashlight mode, the gimbal 2 may be configured to rotate around the roll axis for an angle range of 0° to 45° at the predetermined joint angle position. For example, after the gimbal 2 is controlled to enter the expected photograph mode, the gimbal 2 may be controlled to rotate around the roll axis for 0°, 5°, 10°, 15°, 20°, 25°, 30°, 35°, 40°, or 45° at the predetermined joint angle position. The predetermined joint angle position may include a joint angle position of the roll axis corresponding to the gimbal 2 when the gimbal 2 enters the expected photograph mode to satisfy user photograph needs. For example, when the gimbal 2 is controlled to enter the vertical photograph mode, the joint angle position of the roll axis corresponding to the gimbal 2 may include the joint angle position of the outer frame 21. The outer frame 21 may be rotated around the roll axis for 0° to 45° to cause the gimbal 2 to enter the vertical photograph mode. Thus, the imaging device 3 may capture pictures of different fields of view.

In some embodiments, after the gimbal 2 is controlled to enter the expected photograph mode, if the handheld gimbal is triggered to the non-photograph mode, the gimbal 2 may be controlled to be in an unloading status. The non-photograph mode may include a video playback mode, a parameter set mode, etc. Further, after the gimbal 2 is controlled to be in the unloading status, if the handheld gimbal exits the non-photograph mode, and the current attitude (i.e., the attitude of the handle 1 when the gimbal 2 exits the non-photograph mode) of the handle 1 satisfies the expected photograph mode, the gimbal 2 may be controlled to return to the expected photograph mode to satisfy user application needs. After the gimbal 2 is controlled to be in the unloading status, if the handheld gimbal exits the non-photograph mode, but the current attitude of the handle 1 does not satisfy the expected photograph mode, the gimbal 2 may need to determine the expected photograph mode of the gimbal 2 again according to the current attitude of the gimbal 2. Then, the gimbal 2 may be controlled to enter the expected photograph mode of the gimbal 2 that is determined again.

In some embodiments, the expected photograph mode may further include one of the forward photograph mode and the reverse photograph mode. The forward photograph mode or the reverse photograph mode may be determined according to the third included angle between the seventh axis direction in the coordinate system of the handle 1 and the vertical direction. When the handheld gimbal is positioned upright, the seventh axis direction may be parallel to the vertical direction. For specific description, a reference may be made to the description content of the forward photograph mode and the reverse photograph mode in process S303.

In some embodiments, after the gimbal 2 is controlled to enter the expected photograph mode, the gimbal 2 may switch among different expected photograph modes. In some embodiments, after the gimbal 2 is controlled to enter the expected photograph mode, if the attitude change of the outer frame 21 is detected, the gimbal 2 may be controlled to switch between the vertical photograph mode and the forward photograph mode, between the vertical photograph mode and the reverse photograph mode, between the up flashlight mode and the forward photograph mode, and between the up flashlight mode and the reverse photograph mode according to the attitude change of the outer frame 21.

The handheld gimbal 2 of embodiments of the present disclosure may operate normally. The gimbal 2 may be controlled to enter the flashlight mode or the vertical photograph mode. The attitude component of the roll axis corresponding to the attitude of the gimbal 2 is controlled to stabilize the imaging device 3. The joint angles of the frames corresponding to the flashlight mode and the vertical photograph mode during the stabilization are different. Thus, taking the three-axis gimbal shown in FIG. 1 as an example, in the flashlight mode, the frame corresponding to the stabilization includes the outer frame 21. In the vertical photograph mode, the frame corresponding to the stabilization includes the inner frame. Thus, the gimbal 2 may not switch directly between the vertical photograph mode and the flashlight mode (including the up flashlight mode and the down flashlight mode). Therefore, when the gimbal 2 is in the vertical photograph mode or the flashlight mode, even if the handle 1 is rotated, the attitude of the outer frame 21 may not change and cannot satisfy the forward photograph mode or the reverse photograph mode, the gimbal 2 may still remain in the current vertical photograph mode or the flashlight mode. In some embodiments, when the attitude change of the outer frame 21 is within a predetermined range, the gimbal 2 may be controlled to remain the current expected photograph mode. The predetermined range may be determined according to the current expected photograph mode of the gimbal 2.

In the forward photograph mode or reverse photograph mode, if the attitude change of the handle 1 cannot satisfy the vertical photograph mode or the flashlight mode (including the up flashlight mode and the down flashlight mode), the photograph mode may be switched correspondingly.

In the handheld gimbal control method of embodiments of the present disclosure, when the gimbal 2 enters the movement status, based on the included angle between the first axis direction and/or the second axis direction in the coordinate system of the handle 1 and the vertical direction, the expected photograph mode of the gimbal 2 may be determined. Then, the gimbal 2 may be controlled to enter the expected photograph mode to realize the function that the gimbal 2 may directly enter the up flashlight mode or the vertical photograph mode when entering the movement status without additional operations. Thus, the gimbal 2 has high accuracy and efficiency for the automatic control, which satisfies the user application needs better.

Figure 7:
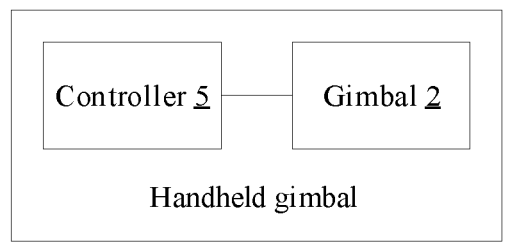
FIG. 7 is a schematic structural block diagram of a handheld gimbal according to some embodiments of the present disclosure.

In connection with FIG. 1, FIG. 2, and FIG. 7, embodiments of the present disclosure further provide the handheld gimbal. The handheld gimbal includes the handle 1, the gimbal 2, and the controller 5. The gimbal 2 may be configured to carry the imaging device 3. The gimbal 2 may be arranged at the handle 1. The controller 5 may be arranged at the handle 1. In some embodiments, the controller 5 may be arranged in the handle 1.

In some embodiments, the controller 5 may be configured to obtain the attitude of the handle 1 when the gimbal 2 enters the movement status, determine the first included angle between the first axis direction in the coordinate system of the handle 1 and the vertical direction and/or the second included angle between the second axis direction in the coordinate system of the handle 1 and the vertical direction, determine the expected photograph mode of the gimbal according to the first included angle and/or the second included angle, and control the gimbal 2 to enter the expected photograph mode. The expected photograph mode may include one of the up flashlight mode and the vertical photograph mode. When the handheld gimbal is positioned upright, the first axis direction and the second axis direction may be orthogonal to the vertical direction.

For the implementation process and operation principle of the controller 5, a reference may be made to the handheld gimbal control method description above, which is not repeated here.

The controller 5 of embodiments of the present disclosure may include a central processing unit (CPU). The controller 5 may further include a hardware chip. The hardware chip may include an application-specific integrated circuit (ASIC), a programmable logic device (PLD), or a combination thereof. The PLD may include a complex programmable logic device (CPLD), a field-programmable gate array (FPGA), a generic array logic (GAL), or any combination thereof.

In addition, embodiments of the present disclosure also provide a computer-readable storage medium on which a computer program is stored. When the program is executed by a processor, the processor is caused to implement the steps of the handheld gimbal control method above.

Those of ordinary skill in the art can understand that all or part of the processes in the above-mentioned method embodiments can be implemented by instructing relevant hardware through a computer program. The program can be stored in a computer-readable storage medium. When the program is executed, the procedures of the above-mentioned method embodiments may be included. The storage medium may include a magnetic disk, an optical disc, a read-only memory (ROM), a random access memory (RAM), etc.

The above-disclosed are only some embodiments of the present disclosure, which of course cannot be used to limit the scope of the present disclosure. Therefore, equivalent changes made according to the claims of the present invention are still within the scope of the present invention.

What is claimed is:

1. A control method of a gimbal device comprising:
   in response to detecting that a trigger event instructing a gimbal of the gimbal device to enter a movement status occurs, determining that the gimbal enters the movement status, the trigger event including an event instructing the gimbal device to restart or an event instructing the gimbal device to exit a sleeping status;
   in response to the gimbal of the gimbal device entering the movement status, obtaining an attitude of a support member of the gimbal device, the gimbal being arranged at the support member;
   determining an expected photograph mode from a plurality of photograph modes according to the attitude of the support member, wherein the plurality of photograph modes comprise an up flashlight mode, a vertical photograph mode, a forward photograph mode, a reverse photograph mode, and a down flashlight mode; and
   controlling the gimbal to enter the expected photograph mode.

2. A gimbal device comprising:
   a support member;
   a gimbal arranged at the support member and configured to carry an imaging device;
   at least one processor; and
   at least one memory including computer program code, wherein the at least one memory and the computer program code are configured, with the at least one processor, to cause the gimbal device to at least:
      in response to detecting that a trigger event instructing the gimbal to enter a movement status occurs, determine that the gimbal enters the movement status, the trigger event including an event instructing the gimbal device to restart or an event instructing the gimbal device to exit a sleeping status;
      in response to the gimbal entering the movement status, obtain an attitude of the support member;
      determine an expected photograph mode from a plurality of photograph modes according to the attitude of the support member, wherein the plurality of photograph modes comprise an up flashlight mode, a vertical photograph mode, a forward photograph mode, a reverse photograph mode, and a down flashlight mode; and
      control the gimbal to enter the expected photograph mode.

3. The gimbal device of claim 2, wherein:
   to determine the expected photograph mode from the plurality of photograph modes according to the attitude of the support member, the at least one memory and the computer program code are further configured, with the at least one processor, to cause the gimbal device to at least, in response to the expected photograph mode including one of the up flashlight mode and the vertical photograph mode:
      according to the attitude of the support member, determine at least one of:
         a first included angle between a first axis direction in a coordinate system of the support member and a vertical direction, or
         a second included angle between a second axis direction in the coordinate system of the support member and the vertical direction; and
      determine the expected photograph mode of the gimbal from the plurality of photograph modes according to at least one of the first included angle or the second included angle; and
   the first axis direction and the second axis direction are orthogonal to the vertical direction in response to the gimbal device being positioned upright.

4. The gimbal device of claim 3, wherein:
   in response to the gimbal device being positioned upright, the first axis direction points to front of the support member, and the second axis direction points to a left side of the support member; and
   the vertical direction is a Z-axis direction in a world coordinate system.

5. The gimbal device of claim 4, wherein to determine the expected photograph mode of the gimbal from the plurality of photograph modes according to the at least one of the first included angle or the second included angle, the at least one memory and the computer program code are further configured, with the at least one processor, to cause the gimbal device to at least:
  in response to the first included angle being in a first predetermined angle range, determine the expected photograph mode of the gimbal to be the up flashlight mode;
  in response to the second included angle being in a second predetermined angle range, determine the expected photograph mode of the gimbal to be a down vertical photograph mode as the vertical photograph mode; or
  in response to the second included angle being in a third predetermined angle range, determine the expected photograph mode of the gimbal to be an up vertical photograph mode as the vertical photograph mode.

6. The gimbal device of claim 2, wherein to control the gimbal to enter the expected photograph mode, the at least one memory and the computer program code are further configured, with the at least one processor, to cause the gimbal device to at least:
  according to the expected photograph mode, determine a position relationship between the vertical direction and a specific plane in a coordinate system of an imaging device carried by the gimbal, the specific plane being formed based on a first axis direction and a second axis direction in a coordinate system of the imaging device, and the first axis direction and the second axis direction being perpendicular to a vertical direction in response to the imaging device being positioned upright; and
  control the gimbal to rotate to cause the imaging device to satisfy the position relationship.

7. The gimbal device of claim 6, wherein:
the gimbal includes an outer frame connected to the support member, the outer frame being configured to rotate around a predetermined direction; and
to control the gimbal to rotate to cause the imaging device to satisfy the position relationship, the at least one memory and the computer program code are further configured, with the at least one processor, to cause the gimbal device to at least:
  determine a target joint angle of the outer frame according to the expected photograph mode;
  control the outer frame to rotate to the target joint angle; and
  control the gimbal to rotate to an expected attitude corresponding to the expected photograph mode to cause the imaging device to satisfy the position relationship.

8. The gimbal device of claim 7, wherein the position relationship is a first position relationship, the specific plane is a first specific plane, and to determine the target joint angle of the outer frame according to the expected photograph mode, the at least one memory and the computer program code are further configured, with the at least one processor, to cause the gimbal device to at least:
  determine a second position relationship between the vertical direction and a second specific plane in a coordinate system of the outer frame, the second specific plane being formed based on a third axis direction and a fourth axis direction in a coordinate system of the outer frame, and the third axis direction and the fourth axis direction being orthogonal to the vertical direction in response to the gimbal device being positioned upright; and
  determine the target joint angle of the outer frame according to the second position relationship.

9. The gimbal device of claim 8, wherein:
the second position relationship:
  a projection of the vertical direction on the second specific plane being on an axis corresponding to the third axis direction; or
  the projection of the vertical direction on the second specific plane being on an axis corresponding to the fourth axis direction; and
at least one of:
  the vertical photograph mode an up vertical photograph mode, in which the projection of the vertical direction on the second specific plan pointing to a direction opposite to the fourth axis direction;
  the vertical photograph mode a down vertical photograph mode, in which the projection of the vertical direction on the second specific plan pointing to a direction same as the fourth axis direction; or
  in the up flashlight mode, the projection of the vertical direction on the second specific plan pointing to a direction same as or opposite to the third axis direction.

10. The gimbal device of claim 7, wherein:
the predetermined direction is a first predetermined direction;
the gimbal further includes:
  a middle frame connected to the outer frame, the middle frame being configured to rotate around a second predetermined direction; and
  an inner frame connected to the middle frame, the inner frame being configured to carry the imaging device and rotate around a third predetermined direction; and
while controlling the outer frame to rotate to the target joint angle, the at least one memory and the computer program code are further configured, with the at least one processor, to cause the gimbal device to at least:
  control a joint angle of the middle frame to be a first predetermined angle and a joint angle of the inner frame to be a second predetermined angle.

11. The gimbal device of claim 7, wherein:
the predetermined direction is a first predetermined direction;
the gimbal further includes:
  an inner frame connected to the outer frame, the inner frame being configured to carry the imaging device and rotate around a second predetermined direction or a third predetermined direction; and
while controlling the outer frame to rotate to the target joint angle, the at least one memory and the computer program code are further configured, with the at least one processor, to cause the gimbal device to at least:
  control a joint angle of the inner frame to be a predetermined angle.

12. The gimbal device of claim 7, wherein:
the gimbal is configured to rotate around a roll axis in the vertical photograph mode; and
to control the gimbal to rotate to the expected attitude corresponding to the expected photograph mode, the at least one memory and the computer program code are further configured, with the at least one processor, to cause the gimbal device to at least:
  determine an attitude component of the gimbal corresponding to the roll axis according to the expected photograph mode; and
  control the gimbal according to the attitude component corresponding to the roll axis to cause the gimbal to rotate to the expected attitude corresponding to the expected photograph mode.

13. The gimbal device of claim 7, wherein:
the gimbal is configured to rotate around a pitch axis in the up flashlight mode; and
to control the gimbal to rotate to the expected attitude corresponding to the expected photograph mode, the at least one memory and the computer program code are further configured, with the at least one processor, to cause the gimbal device to at least:
  determine an attitude component of the gimbal corresponding to the pitch axis according to the expected photograph mode; and
  control the gimbal according to the attitude component corresponding to the pitch axis to cause the gimbal to rotate to the expected attitude corresponding to the expected photograph mode.

14. The gimbal device of claim 7, wherein:
in the vertical photograph mode, the position relationship the specific plane in the coordinate system of the imaging device carried by the gimbal being nearly parallel to the vertical direction; or
in the up flashlight mode, the position relationship the specific plane in the coordinate system of the imaging device carried by the gimbal being nearly perpendicular to the vertical direction.

15. The gimbal device of claim 2, wherein:
the gimbal is configured to rotate around an axis in an angle range of 0° to 45° at a predetermined joint angle position after the gimbal is controlled to enter the expected photograph mode, the predetermined joint angle position including a joint angle position of the axis corresponding to the gimbal in response to the gimbal entering the expected photograph mode; and
the axis is a pitch axis in the vertical photograph mode or a roll axis in the up flashlight mode.

16. The gimbal device of claim 2, wherein:
to determine the expected photograph mode from the plurality of photograph modes according to the attitude of the support member, the at least one memory and the computer program code are further configured, with the at least one processor, to cause the gimbal device to at least:
  according to the attitude of the support member, determine:
    a first included angle between a first axis direction in a coordinate system of the support member and a vertical direction, and
    a second included angle between a second axis direction in the coordinate system of the support member and the vertical direction; and
  determine the expected photograph mode of the gimbal in the plurality of photograph modes according to the first included angle, the second included angle, and a third included angle; and
the third included angle is between a third axis direction in the coordinate system of the support member and the vertical direction, and the third axis direction is parallel to the vertical direction in response to the gimbal device being positioned upright.

17. The gimbal device of claim 16, wherein:
a first target angle includes one of the first included angle, the second included angle, and the third included angle;
a second target angle includes one of the first included angle, the second included angle, and the third included angle;
a third target angle includes one of the first included angle, the second included angle, and the third included angle; and to determine the expected photograph mode of the gimbal from the plurality of photograph modes according to the first included angle, the second included angle, and the third included angle, the at least one memory and the computer program code are further configured, with the at least one processor, to cause the gimbal device to at least:
  detect whether the first target angle is in a first target angle range;
  in response to the first target angle being in the first target angle range, determine the expected photograph mode of the gimbal from the plurality of photograph modes according to the first target angle; and
  in response to the first target angle being not in the first target angle range:
    detect whether the second target angle is in a second target angle range;
      in response to the second target angle being in the second target angle range, determine the expected photograph mode of the gimbal from the plurality of photograph modes according to the second target angle; and
      in response to the second target angle being not in the second target angle range, determine the expected photograph mode of the gimbal from the plurality of photograph modes according to the third target angle.

18. The gimbal device of claim 2, wherein to obtain the attitude of the support member, the at least one memory and the computer program code are further configured, with the at least one processor, to cause the gimbal device to at least:
  detect an attitude of the gimbal using a sensor; and
  calculate the attitude of the support member using the detected attitude of the gimbal and joint angles of motors of the gimbal.

19. The gimbal device of claim 2, further comprising:
a display arranged at front of the support member, the support member including a handle;
wherein in response to the gimbal device being positioned upright, the display is configured to face a user holding the gimbal device, and a lens of the imaging device is configured to face away from the user.

20. A gimbal device comprising:
a support member;
a gimbal arranged at the support member and configured to carry an imaging device;
at least one processor; and
at least one memory including computer program code, wherein the at least one memory and the computer program code are configured, with the at least one processor, to cause the gimbal device to at least:
  in response to detecting that a trigger event instructing the gimbal to enter a movement status occurs, determine that the gimbal enters the movement status, the trigger event including at least one of an event instructing the gimbal device to turn on, an event instructing the gimbal device to restart, or an event instructing the gimbal device to exit a sleeping status;
  in response to the gimbal entering the movement status, obtain an attitude of the support member of the gimbal device, the gimbal being arranged at the support member;

determine whether an expected photograph mode is an up flashlight mode or a vertical photograph mode according to the attitude of the support member; and
control the gimbal to enter the expected photograph mode.

\* \* \* \* \*